United States Patent
Takeshima et al.

(10) Patent No.: US 9,823,682 B2
(45) Date of Patent: Nov. 21, 2017

(54) PARKING BRAKE OPERATING DEVICE

(75) Inventors: Toshiro Takeshima, Toyota (JP);
Mitsuo Yoshida, Toyota (JP); Kozo Ryutaki, Toyota (JP)

(73) Assignee: TOYODA IRON WORKS CO., LTD., Toyota (JP)

( * ) Notice: Subject to any disclaimer, the term of this patent is extended or adjusted under 35 U.S.C. 154(b) by 0 days.

(21) Appl. No.: 14/124,918

(22) PCT Filed: Apr. 17, 2012

(86) PCT No.: PCT/JP2012/060384
§ 371 (c)(1),
(2), (4) Date: Dec. 9, 2013

(87) PCT Pub. No.: WO2012/169283
PCT Pub. Date: Dec. 13, 2012

(65) Prior Publication Data
US 2014/0245854 A1    Sep. 4, 2014

(30) Foreign Application Priority Data
Jun. 10, 2011    (JP) .................... 2011-130724

(51) Int. Cl.
G05G 1/04    (2006.01)
G05G 5/18    (2006.01)
B60T 7/10    (2006.01)

(52) U.S. Cl.
CPC ............... *G05G 1/04* (2013.01); *B60T 7/105* (2013.01); *G05G 5/18* (2013.01); *Y10T 74/20238* (2015.01)

(58) Field of Classification Search
CPC ............... B60T 7/105; Y10T 74/20696; Y10T 74/20612; Y10T 74/20238; G05G 5/18; G05G 1/04

(Continued)

(56) References Cited

U.S. PATENT DOCUMENTS 3,722,318 A * 3/1973 Asou et al. .................... 74/535
4,876,914 A * 10/1989 Kanno ............................ 74/538

(Continued)

FOREIGN PATENT DOCUMENTS

CN    1990317 A    7/2007
DE    3428156 A1 *    2/1986

(Continued)

OTHER PUBLICATIONS

Machine translation of JP 2000-177548 A obtained on Apr. 28, 2015.*

(Continued)

*Primary Examiner* — Adam D Rogers
(74) *Attorney, Agent, or Firm* — Oliff PLC

(57) ABSTRACT

A parking brake operating device includes: a lever body; a pole pivotally arranged inside a proximal end portion of the lever body, and restricts pivoting movement of the lever body; and a release rod pivotally connected to the pole, and causes the pole to disengage from the ratchet when a release knob is pushed, the operating portion being provided with a slit being provided with a wide portion into which a pivot connecting portion for the release rod and the pole is introduced, the wide portion being provided in a part of the slit; the wide portion having parallel portions; and the release rod and the pole fitted at positions in the lever body by introducing the release rod and the pivot connecting portion into the operating portion through the slit, and moving the release rod and the pivot connecting portion in this state toward the proximal end portion.

5 Claims, 9 Drawing Sheets

(58) Field of Classification Search
USPC .... 74/473.3, 491, 523–525, 535–537, 577 R
See application file for complete search history.

(56) References Cited

U.S. PATENT DOCUMENTS

| | | | | |
|---|---|---|---|---|
| 5,247,850 A * | 9/1993 | Lenzke | ............... | B60T 7/105 74/523 |
| 7,669,503 B2 * | 3/2010 | Takeshima | ............ | B60T 7/105 16/431 |
| 7,748,290 B2 * | 7/2010 | Choi | ............................ | 74/537 |
| 7,779,722 B2 * | 8/2010 | Kawano | ................ | B60T 7/105 74/501.6 |

FOREIGN PATENT DOCUMENTS

| | | | | |
|---|---|---|---|---|
| DE | 3727625 C1 * | 1/1989 | ............. | B60T 7/105 |
| DE | 19847524 A1 * | 5/2000 | ............. | B60T 7/105 |
| JP | U-3-108572 | 11/1991 | | |
| JP | 08324396 A * | 12/1996 | | |
| JP | A-2000-177548 | 6/2000 | | |
| JP | A-2007-276520 | 10/2007 | | |

OTHER PUBLICATIONS

Translation of JP 3-108572 U dated Apr. 29, 2015.*
International Search Report issued in International Patent Application No. PCT/JP2012/060384 dated Jul. 10, 2012.
Partial Translation of the Written Opinion of the International Searching Authority issued in International Patent Application No. PCT/JP2012/060384 dated Jul. 10, 2012.
May 27, 2015 Office Action issued in Chinese Patent Application No. 201280028497.7.
Fay 6, 2016 Search Report issued in European Patent Application No. 12797432.7.

* cited by examiner

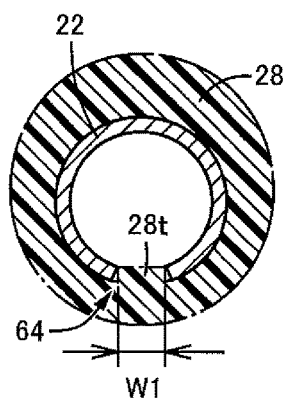
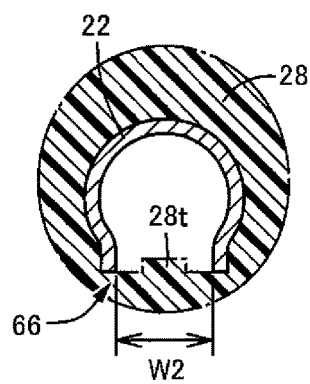
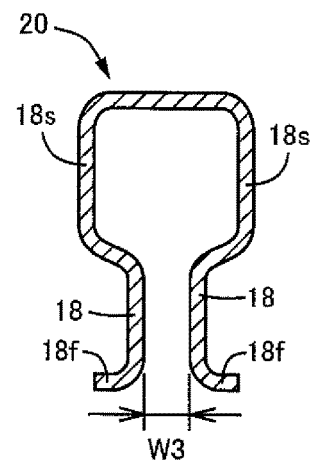
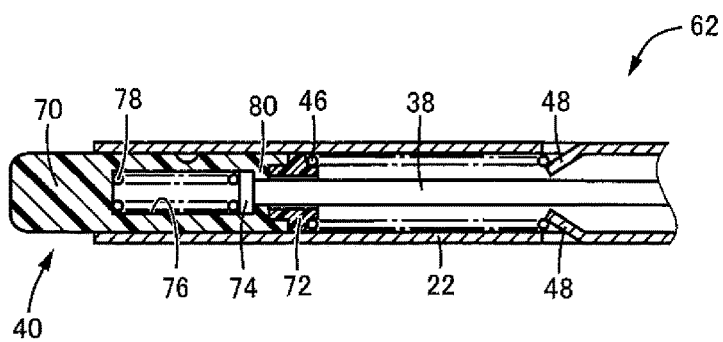

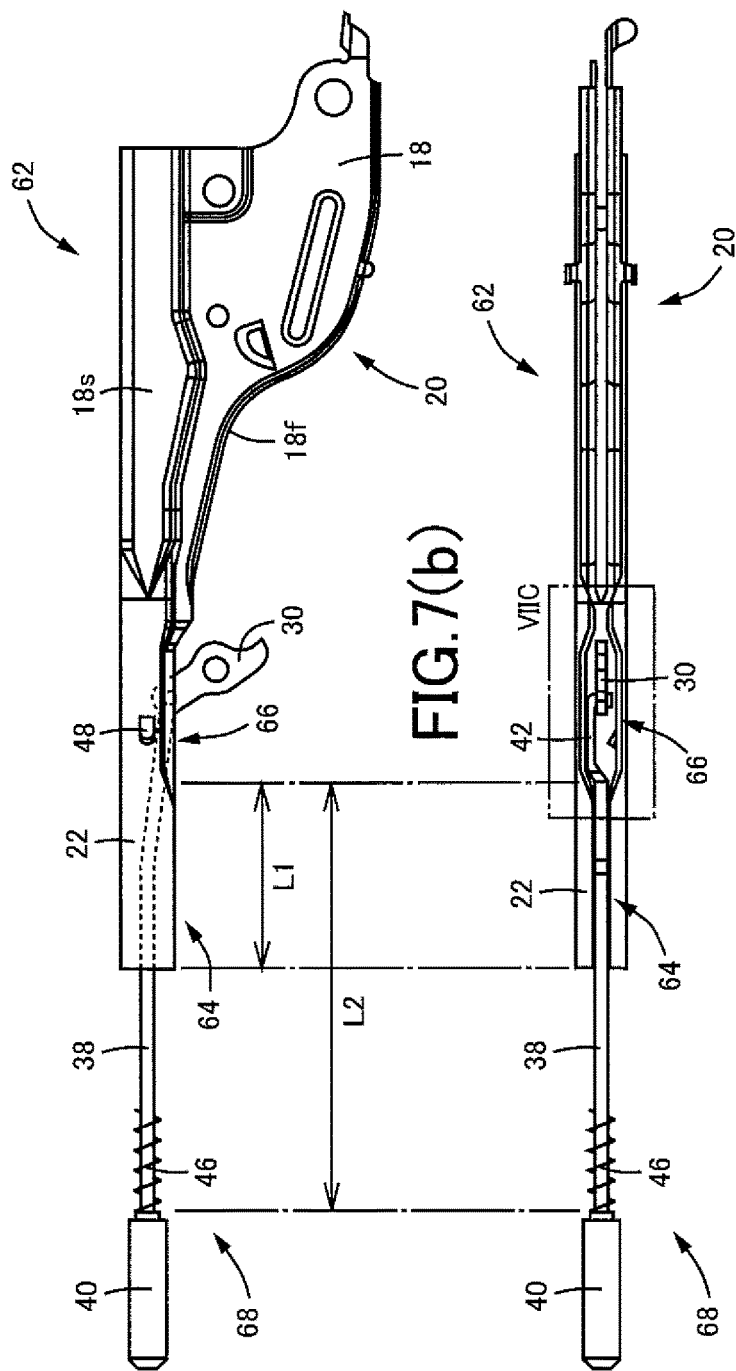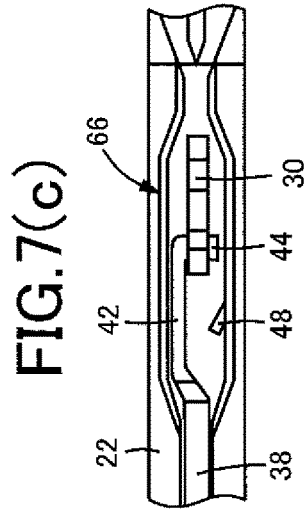

Prior Art

Prior Art

PARKING BRAKE OPERATING DEVICE

TECHNICAL FIELD

The present invention relates to a parking brake operating device, and particularly to a technology that enables a release rod, a pole, and a release knob to be efficiently fitted to a lever body without causing deterioration in stiffness and design.

BACKGROUND ART

There is known a parking brake operating device that includes: (a) a lever body that includes a proximal end portion whose section has a substantially inverted U-shape, and an operating portion with a substantially cylindrical shape, the proximal end portion being arranged across a support member and pivotally supported; (b) a pole that is pivotally arranged inside the proximal end portion of the lever body, and restricts pivoting movement of the lever body so as to maintain a parking brake in an operating state when the pole is meshed with a ratchet provided in the support member in accordance with an urging force of urging means; and (c) a release rod that is connected to the pole so as to be able to pivot relative to the pole, and causes the pole to pivot so that the pole is disengaged from the ratchet when a release knob projecting from a distal end of the operating portion is pushed in (see Patent Documents 1 and 2).

FIG. 8 is a sectional view showing an example of such a parking brake operating device, and a lever body 12 of an operating lever 10 is pivotally supported by a semicircular support member 14 through a support shaft 16. The lever body 12 is formed by pressing a metallic plate material. As shown in FIG. 9, the lever body 12 includes a proximal end portion 20 which has a pair of substantially flat side walls 18 and whose section has a substantially inverted U-shape, and an operating portion 22 with a substantially cylindrical shape. The proximal end portion 20 is arranged across the substantially vertical plate-shaped support member 14, and is pivotally supported by a substantially horizontal support shaft 16. A connecting pin 24 is fixedly fitted to the proximal end portion 20 across the side walls 18 on both sides, and is inserted through a through hole 26 provided in the support member 14 along an arc about the support shaft 16. The cylindrical operating portion 22 of the lever body 12 is a portion that is gripped by a driver and pivoted about the support shaft 16, and a grip 28 made of a synthetic resin is fitted to the periphery of the operating portion 22. When the grip 28 is gripped and the operating lever 10 is pivoted about the support shaft 16 in a clockwise direction, a cable or the like (not shown) is pulled, and thus, a parking brake is operated. In FIG. 9, a reference numeral 16h in the lever body 12 indicates a fitting hole for the support shaft 16, and a reference numeral 24h indicates a fitting hole for the connecting pin 24.

A pole 30 is arranged inside the proximal end portion 20 of the lever body 12, and is pivotally fitted to a pole pin 32 that is parallel to the support shaft 16. When the pole 30 is meshed with a ratchet 34 provided in the support member 14, backward pivoting movement of the operating lever 10 is restricted (pivoting movement about the support shaft 16 in a counterclockwise direction in FIG. 8 is restricted), and a parking brake is maintained in an operating state. A release rod 38, which is connected to the pole 30 so as to be able to pivot relative to the pole 30, is arranged so as to be inserted through the operating portion 22 in an axial direction. When a release knob 40 projecting from a distal end of the operating portion 22 is pressed in, the pole 30 is pivoted about the pole pin 32 in a clockwise direction through the release rod 38, and thus, the pole 30 is disengaged from the ratchet 34. This allows the operating lever 10 to pivot about the support shaft 16 backward in the counterclockwise direction so as to release the parking brake. A reference numeral 32h in the lever body 12 in FIG. 9 indicates a fitting hole for the pole pin 32.

A compression coil spring 46 is arranged between the release knob 40 and the operating portion 22, urges the release knob 40 in a direction in which the release knob 40 projects from the distal end of the operating portion 22, and urges the pole 30 through the release rod 38 in a meshing direction in which the pole 30 is meshed with the ratchet 34 (a counterclockwise direction about the pole pin 32), thereby allowing the pole 30 and the ratchet 34 to mesh with each other. In both side surfaces of the operating portion 22, securing lugs 48, to which the compression coil spring 46 is secured, are provided by cutting out a U-shaped portion from each of the both side surfaces of the operating portion 22, and bending the U-shaped portion inwardly (see FIG. 9). The compression coil spring 46 corresponds to urging means.

A pivot connecting portion 42, by which the release rod 38 is connected to the pole 30 so as to be able to pivot relative to the pole 30, is bent to be offset by about a half of a plate thickness of the pole 30 in a direction perpendicular to a pivot plane of the operating lever 10 (a direction perpendicular to a sheet surface of FIG. 8) so that the pole 30 and an axis of the release rod 38 are positioned in substantially the same plane (see FIG. 9). In a distal end of the release rod 38, a distal end bent portion 44, which is bent by 90 degrees, is provided, and the pole 30 is connected to the distal end bent portion 44 so as to be able to pivot relative to the distal end bent portion 44. In an upper part of the proximal end portion 20 of the lever body 12, in other words, in the vicinity of a circularly-bent portion in an inverted U-shape, a housing portion 18s, in which a distance between the pair of side walls 18 is large, is provided so that the release rod 38 and the pivot connecting portion 42 are housed therein. On the other hand, in a lower portion of the proximal end portion 20, which is located on both sides of the support member 14, the distance between the pair of side walls 18 is small, and the lower portion is substantially in contact with side surfaces of the support member 14. Also, flanges 18f, which are bent by substantially 90 degrees outwardly, are provided in lower end edges of the proximal end portion 20, and thus, stiffness of the proximal end portion 20 is increased.

RELATED ART DOCUMENT

Patent Document

Patent Document 1: Japanese Utility Model Application Publication No. 3-108572
Patent Document 2: Japanese Patent Application Publication No. 2007-276520

SUMMARY OF THE INVENTION

Problem to be Solved by the Invention

In such a parking brake operating device, in order to improve efficiency of assembly operation, it is effective to fit the release rod 38 to the lever body 12 in a state where the pole 30 and the release knob 40 are fitted to the release rod 38. However, for example, as shown in FIG. 9, when trying to insert the assembly of the pole 30, the release knob 40, and the release rod 38 into an upper opening (the housing portion 18s) on a rear end side of the lever body 12, from the release knob 40-side, the release knob 40 interferes with the securing lugs 48 provided in the operating portion 22. It is also considered to fit the assembly of the pole 30, the release knob 40, and the release rod 38 to the lever body 12 by sliding the assembly as indicated by outlined arrows in FIG. 10. However, it is necessary to increase a width dimension of an opening portion at a lower end of the lever body 12 in accordance with dimensions of the release rod 38 and the pivot connecting portion 42, and particularly when a large opening portion is provided in an introduction portion 50 for the pivot connecting portion 42, it becomes difficult to provide the flanges 18f due to design constraint, and stiffness of the proximal end portion 20 is thus reduced.

The present invention has been made in view of the foregoing situations, and an object of the present invention is to allow a release rod to be efficiently fitted to a lever body in a state where a pole and a release knob are fitted to the release rod, without causing deterioration of stiffness and design.

Means for Solving the Problem

To achieve the object, the first aspect of the invention provides a parking brake operating device that includes: (a) a lever body that includes a proximal end portion whose section has a substantially inverted U-shape and an operating portion with a substantially cylindrical shape, the proximal end portion being arranged across a support member and pivotally supported; (b) a pole that is pivotally arranged inside the proximal end portion of the lever body, and restricts pivoting movement of the lever body so as to maintain a parking brake in an operating state when the pole is meshed with a ratchet provided in the support member in accordance with an urging force of urging means; and (c) a release rod that is connected to the pole so as to be able to pivot relative to the pole, and causes the pole to pivot so that the pole is disengaged from the ratchet when a release knob, which projects from a distal end of the operating portion, is pushed in, characterized in that: (d) the operating portion is provided with a slit that is continuous with an opening with the inverted U-shape in the proximal end portion, and extends in an axial direction of the cylindrical shape; (e) the slit has a width dimension that allows the release rod to be introduced, and is provided with a wide portion into which a pivot connecting portion for the release rod and the pole is able to be introduced; and (f) the release rod and the pole are fitted at given positions in the lever body by introducing the release rod and the pivot connecting portion into the operating portion through the slit, and moving the release rod and the pivot connecting portion in this state toward the proximal end portion.

The second aspect of the invention provides the parking brake operating device recited in the first aspect of the invention, wherein (a) the wide portion is provided at a position in a vicinity of the proximal end portion in a longitudinal direction of the slit, and (b) a distance L1 from the wide portion to the distal end of the operating portion is shorter than a distance L2 from the pivot connecting portion of the release rod to the release knob.

Effects of the Invention

In the parking brake operating device as described above, the slit, which is provided in the cylindrical operating portion in the axial direction, has the width dimension that allows the release rod to be introduced, and is provided with the wide portion into which the pivot connecting portion is able to be introduced. It is possible to introduce the release rod and the pivot connecting portion into the operating portion through the slit, and to fit the release rod and the pole at a given position within the lever body by moving the release rod and the pivot connecting portion in the state where they are introduced into the operating portion toward the proximal end portion. Therefore, it is possible to effectively fit the release rod to the lever body in a state where the pole and the release knob are fitted to the release rod. Also, since the wide portion is provided in the slit of the operating portion, which is away from the proximal end portion supported by the support member, reduction in stiffness of the lever body is suppressed compared to a case where a wide portion is provided in the proximal end portion on which a large operation force acts. Also, since it is only necessary to partially increase the width dimension of the slit provided in the cylindrical operating portion, design is appropriately maintained.

In the second aspect of the invention, the wide portion is provided at a position in a vicinity of the proximal end portion, and the distance L1 from the wide portion to the distal end of the operating portion is shorter than the distance L2 from the pivot connecting portion of the release rod to the release knob. Therefore, it is possible to introduce the release rod and the pivot connecting portion into the operating portion through the slit in the state in which the pole and the release knob are fitted to the release rod. Then, by moving the release rod and the pivot connecting portion toward the proximal end portion of the lever body, the release knob is inserted into the operating portion from the distal end opening of the operating portion, and thus, the release knob, the release rod, and the pole are fitted at given positions inside the lever body. In that case, since the wide portion is provided at a position in a vicinity of the proximal end portion, reduction in feel of operation when gripping and operating the operating portion is suppressed. In other words, when gripping and operating the operating portion, a reduction in feel of operation due to existence of the wide portion is minimized because it is often the case that a distal end side portion of the operating portion is gripped.

BRIEF DESCRIPTION OF THE DRAWINGS

FIG. 1(a) to FIG. 1(c) are view explaining a parking brake operating device that is an embodiment of the present invention, in which FIG. 1(a) is a longitudinal sectional view of the parking brake operating device, FIG. 1(b) is a perspective view of the lever body, and FIG. 1(c) is a perspective view of a rod assembly in which a release knob and a pole are fitted to the release rod.

FIG. 2(a) to FIG. 2(c) are sectional views of parts in FIG. 1(b), in which FIG. 2(a) is a sectional view of a part seen in a direction indicated by arrows IIA-IIA, FIG. 2(b) is a sectional view of a part seen in a direction indicated by arrows IIB-IIB, and FIG. 2(c) is a sectional view seen in a direction indicated by arrows IIC-IIC, FIG. 2(a) and FIG. 2(b) are views in which the grip made of a synthetic resin is also shown.

FIG. 3 is a sectional view of a proximal end portion of the lever body, in which the release knob is arranged, and is a sectional view which is taken along a substantially horizontal plane that is out of phase with FIG. 1(a) by 90 degrees, and in which the grip is omitted.

FIG. 4(a) and FIG. 4(b) are views showing the lever body alone, in which FIG. 4(a) is a front view, and FIG. 4(b) is a bottom view seen from underneath of FIG. 4(a).

FIG. 5(a) and FIG. 5(b) are views showing the rod assembly in which the release knob and the pole are fitted to the release rod alone, in which FIG. 5(a) is a front view, and FIG. 5(b) is a bottom view seen from underneath of FIG. 5(a).

FIG. 6 is a front view explaining a procedure when the rod assembly of FIG. 5(a) and FIG. 5(b) is fitted to the lever body of FIG. 4(a) and FIG. 4(b).

FIGS. 7(a) to 7(c) are views showing a state where the rod assembly is introduced into the operating portion of the lever body in process A of FIG. 6 when the rod assembly is fitted, in which FIG. 7(a) is a front view, FIG. 7(b) is a bottom view seen from underneath of FIG. 7(a), and FIG. 7(c) is an enlarged view of a part VIIC in FIG. 7(b).

MODES FOR CARRYING OUT THE INVENTION

A parking brake operating device according to the present invention is, for example, arranged next to a driver's seat, and is configured so that an operating portion of a lever body is held in a substantially horizontal posture so as to extend toward a front of a vehicle, in an initial position. However, various forms may be employed. For example, the operating portion may be inclined from a horizontal direction at a given angle in the initial position, or the parking brake operating device may be arranged in a console box part in front of a driver's seat, or the like, and the operating portion may be held in a substantially vertical posture so as to extend upward, in the initial position. The lever body does not necessarily need to be integrally pivoted about a support shaft, and various forms may be employed. For example, it is possible to employ a folding-type operating lever that is allowed to be folded in an intermediate part by, for example, connecting an operating portion to a proximal end portion so that the operating portion is able to pivot.

Figure 8:
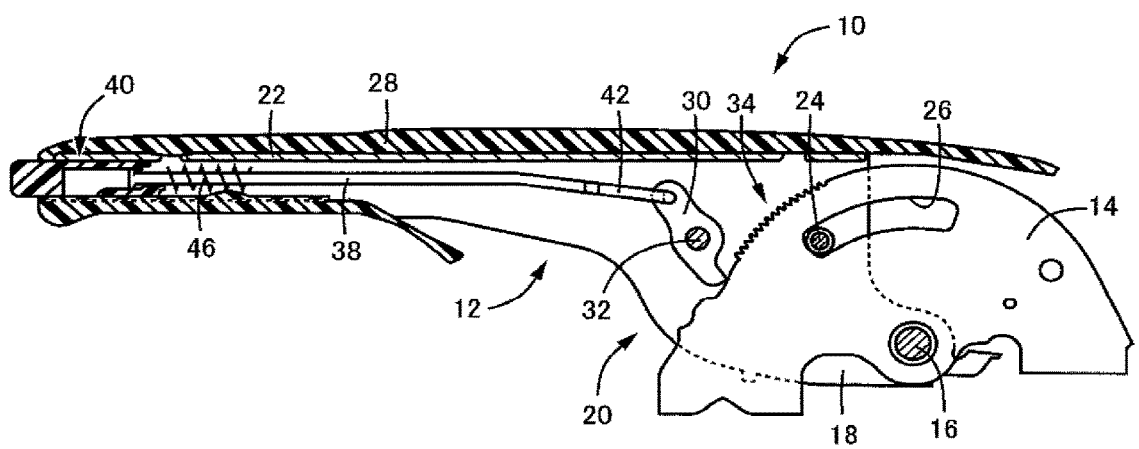
FIG. 8 is a view explaining an example of a conventional parking brake operating device, and is a longitudinal sectional view corresponding to FIG. 1(a).
Figure 9:
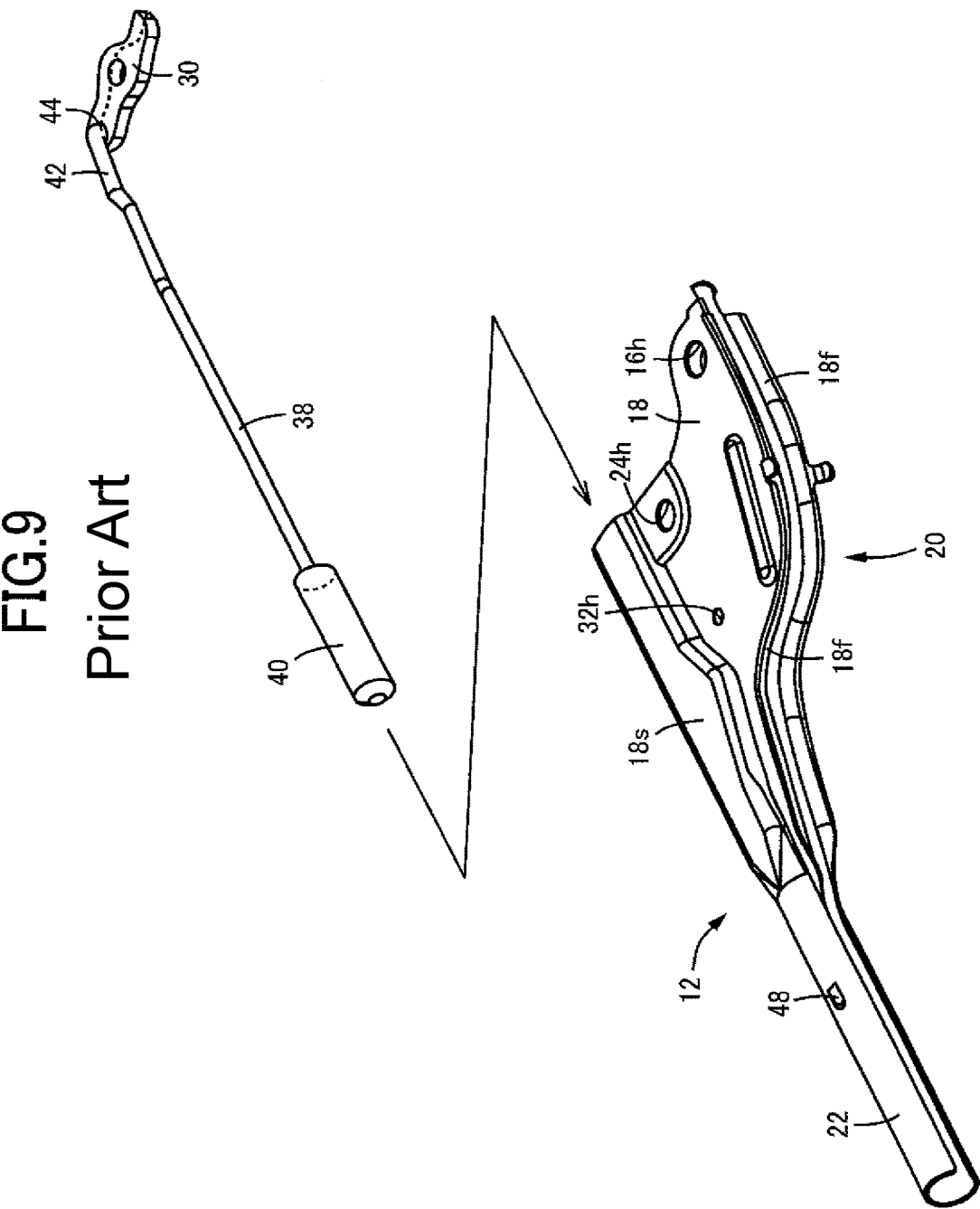
FIG. 9 is a view explaining an example of an assembly method when the release rod is fitted to the lever body in a state where the release knob and the pole are fitted to the release rod in the parking brake operating device of FIG. 8.
Figure 10:
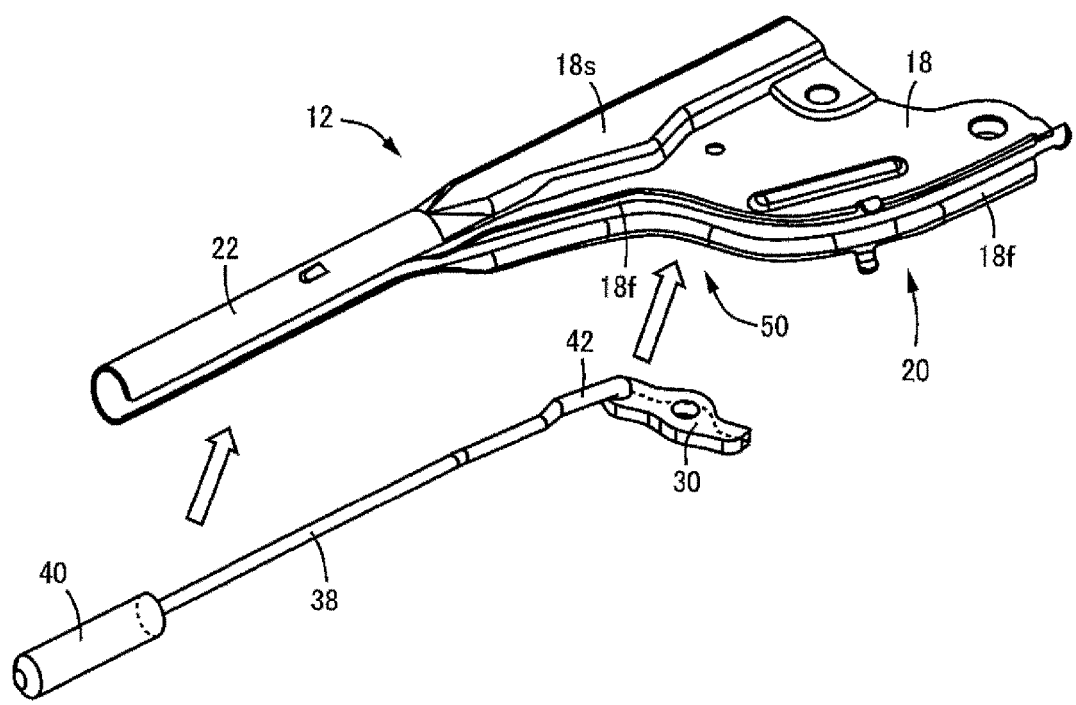
FIG. 10 is a view explaining an example of another assembly method when the release rod is fitted to the lever body in the state where the release knob and the pole are fitted to the release rod in the parking brake operating device of FIG. 8.

Urging means for urging a pole may be a member that urges the pole indirectly through a release knob and a release rod in a meshing direction, such as the foregoing compression coil spring 46 shown in FIG. 8. However, other various forms may be employed. For example, a torsion coil spring which is directly secured to the pole and thus urges the pole may be used. It is also possible to separately provide urging means for urging the pole, and urging means for urging the release knob in a projecting direction.

Although it is preferable that a wide portion, which is provided in a slit, is provided at a position in the vicinity of the proximal end portion in a longitudinal direction of the slit as in the second invention, it is also possible to provide the wide portion in a center portion or the like of the slit in the longitudinal direction. When implementing the second invention, it is preferable that the wide portion is provided in a part of the slit, which is closest to the proximal end portion.

In implementing the present invention, it is preferable that a distance L1 from the wide portion to a distal end of the operating portion is shorter than a distance L2 from a pivot connecting portion of the release rod to the release knob so that the release rod is able to be fitted to the lever body in a state where the release knob and the pole are fitted to the release rod, as in the second invention. However, even in that case, an assembly method may be determined as appropriate. For example, only the release rod and the pole may be fitted to the lever body first, and the release knob may be connected to the release rod later. In implementing the first invention, the distance L1 from the wide portion to the distal end of the operating portion may be longer than the distance L2 from the pivot connecting portion of the release rod to the release knob, and the release knob may be inserted into a distal end opening of the operating portion and connected to the release rod after the release rod and the pole are fitted at given positions in the lever body.

EXAMPLE

Figure 1A:
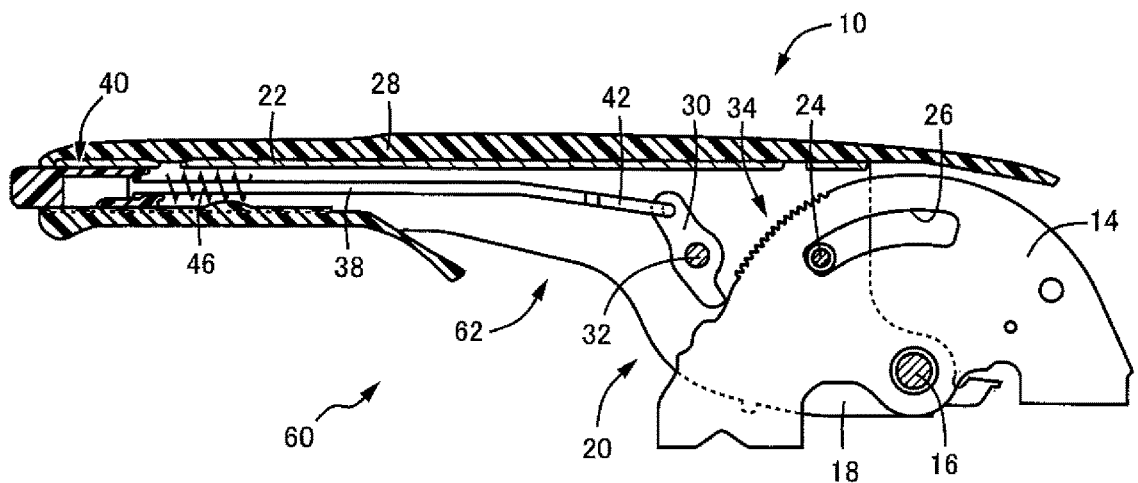
Figure 1B:
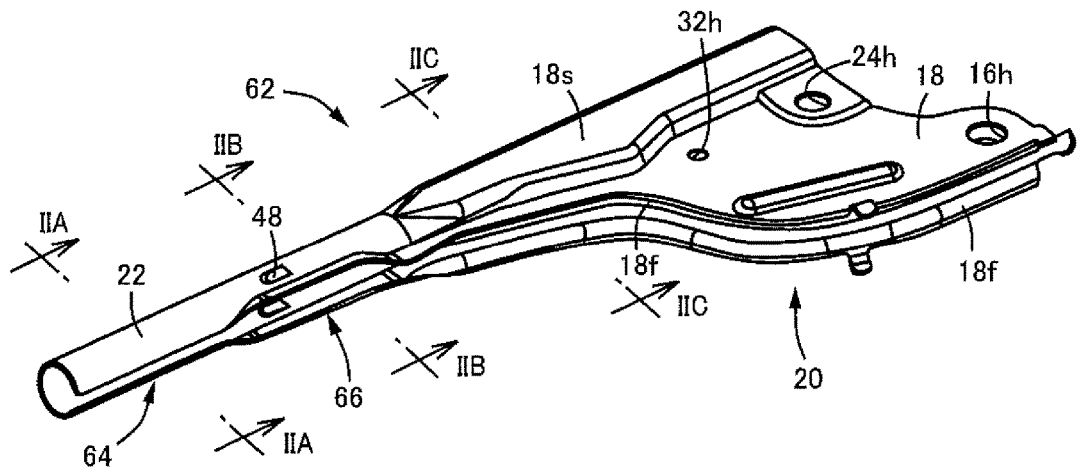
Figure 1C:
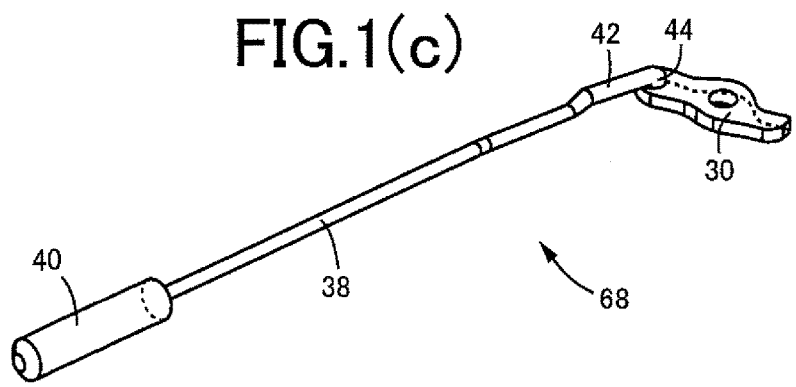

An example of the present invention will be described in detail with reference to the drawings. A parking brake operating device 60 shown in FIG. 1(a) to FIG. 1(c) represents a case where the present invention is applied to the foregoing parking brake operating device shown in FIG. 8, and the same reference numerals are assigned to parts in common with those of the parking brake operating device in FIG. 8, and detailed description thereof is thus omitted. The parking brake operating device 60 is arranged next to a driver's seat, and is configured so that an operating portion 22 of a lever body 62 is held in a substantially horizontal posture so as to extend toward a front of a vehicle, in an initial position. When a grip 28 is gripped and an operating lever 10 is pulled upward and pivoted about a support shaft 16 in a clockwise direction, a cable or the like is pulled, and thus, a parking brake is mechanically operated. The lever body 62 is different from the foregoing lever body 12 in that a slit 64 with a given width dimension W1 is provided, and a wide portion 66 with a width dimension W2 larger than the width dimension W1 is provided at a given position of the slit 64.

Figure 4A:
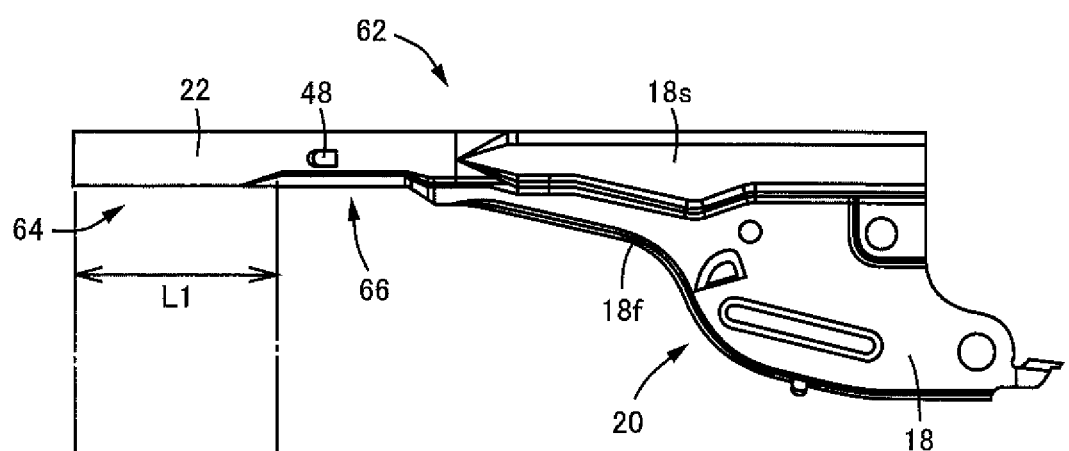
Figure 4B:
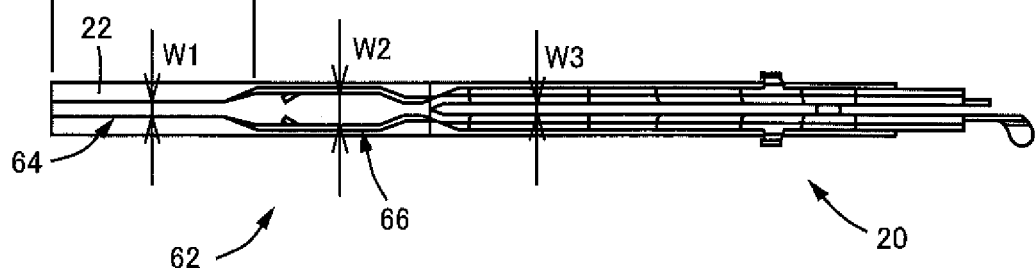
Figure 5A:
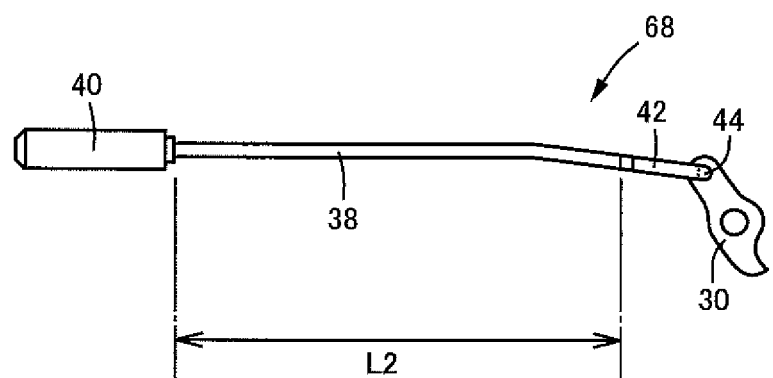
Figure 5B:
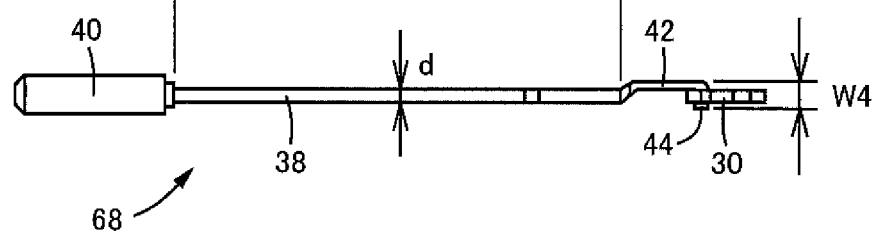

FIG. 1(a) is a longitudinal sectional view of the parking brake operating device 60, FIG. 1(b) is a perspective view of the lever body 62, and FIG. 1(c) is a perspective view of a rod assembly 68 in which a release knob 40 and a pole 30 are fitted to the release rod 38. FIG. 2(a) to FIG. 2(c) are sectional views of parts in FIG. 1(b), in which FIG. 2(a) is a sectional view of a part seen in a direction indicated by arrows IIA-IIA, in other words, a part where the slit 64 is provided, FIG. 2(b) is a sectional view of a part seen in a direction indicated by arrows IIB-IIB, in other words, a part where the wide portion 66 is provided, and FIG. 2(c) is a sectional view seen in a direction indicated by arrows IIC-IIC. FIG. 2(a) and FIG. 2(b) are views in which the grip 28 is also shown. FIG. 3 is a sectional view of a proximal end portion of the lever body 62, in which the release knob 40 is arranged, and is a sectional view which is taken along a substantially horizontal plane that is out of phase with FIG. 1(a) by 90 degrees, and in which the grip 28 is omitted. FIG. 4(a) and FIG. 4(b) are views showing the lever body 62 alone, in which FIG. 4(a) is a front view, and FIG. 4(b) is a bottom view seen from underneath of FIG. 4(a). FIG. 5(a) and FIG. 5(b) are views showing the rod assembly 68 alone, in which FIG. 5(a) is a front view, and FIG. 5(b) is a bottom view seen from underneath of FIG. 5(a).

The slit 64 is provided on a lower side of the operating portion 22 so as to be continuous with an opening with the inverted U-shape in the proximal end portion 20, extends in an axial direction of a cylindrical shape of the operating portion 22, and is provided over the entire length of the operating portion 22. The width dimension W1 of a part of the slit 64 other than the wide portion 66 is slightly larger than a diameter d of the release rod 38 so that the release rod 38 is able to be introduced. As apparent from FIG. 2(a), a positioning projection 28t of the grip 28 is fitted to the slit 64. The wide portion 66 of the slit 64 is provided in a part of the operating portion 22, which is closest to the proximal end portion 20 in a longitudinal direction, and the width dimension W2 of the wide portion 66 is slightly larger than a width dimension W4 of a pivot connecting portion 42 (see FIG. 5(a) and FIG. 5(b)) of the release rod 38 so that the pivot connecting portion 42 is able to be introduced. Thus, it is possible to introduce the release rod 38 into the operating portion 22 through the slit 64, and it is also possible to introduce the pivot connecting portion 42, to which the pole 30 is fitted, into the operating portion 22 through the wide portion 66 of the slit 64. As apparent from FIG. 2(b), an open end of the wide portion 66 has parallel portions that not only increase a gap but also are parallel to each other, and thus a given stiffness is ensured. A gap W3 between a pair of side walls 18 in the proximal end portion 20 is substantially the same as a plate thickness of the support member 14, and a plate thickness of the pole 30 is equal to or smaller than the plate thickness of the support member 14, and thus, the pole 30 is able to be inserted between the pair of side walls 18.

The distance L1 from a front end portion of a part where the wide portion 66 is provided, to a distal end of the operating portion 22 in the lever body 62 is shorter than the distance L2 from a front end portion of the pivot connecting portion 42 of the release rod 38 to the release knob 40 in the rod assembly 68. Thus, it is possible to introduce the release rod 38 into the operating portion 22 through the slit 64 in the state of the rod assembly 68 in which the release knob 40 and the pole 30 are fitted to the release rod 38, and it is also possible to introduce the pivot connecting portion 42, to which the pole 30 is fitted, into the operating portion 22 from the wide portion 66 of the slit 64. The distance L2 is sufficiently larger than the distance L1, and it is thus possible to introduce the release rod 38 into the operating portion 22 in the state where the compression coil spring 46 is fitted to the release rod 38.

Figure 6:
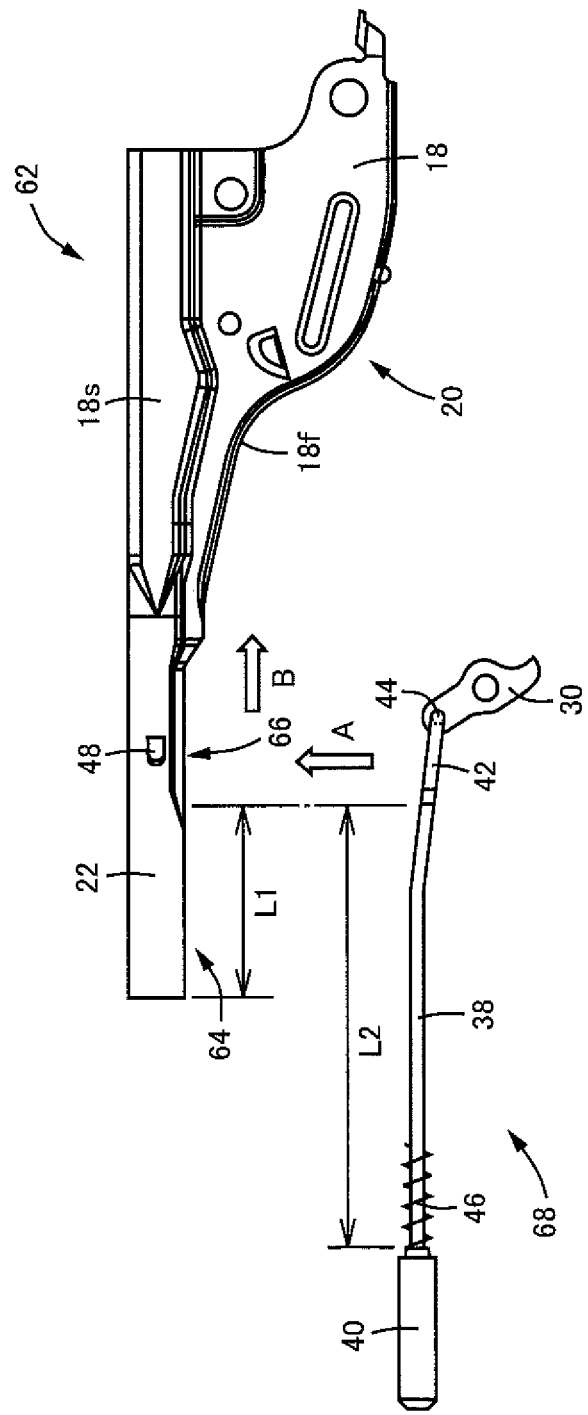

FIGS. 7(a) to 7(c) show a state where the release rod 38 and the pivot connecting portion 42 are introduced into the operating portion 22, and by sliding the rod assembly 68 from this state toward the proximal end portion 20 of the lever body 62, in other words, toward the right in FIG. 7(a) to FIG. 7(c), the rod assembly 68 is inserted to a given fitting position shown in FIG. 1(a). Then, as the pole 30 is pivotally connected to the lever body 62 by a pole pin 32, the rod assembly 68 is fitted to the lever body 62. An end portion of the compression coil spring 46 on a side opposite to the release knob 40 is secured to securing lugs 48 provided in the operating portion 22. Thus the compression coil spring 46 is in a given compressed state, urges the release knob 40 in a direction in which the release knob 40 projects from the operating portion 22, and urges the pole 30 in a meshing direction through the release knob 40 and the release rod 38. FIG. 6 is a view explaining a procedure when the rod assembly 68 is fitted to the lever body 62, and an outlined arrow A indicates a process of introducing the release rod 38 into the operating portion 22 as shown in FIG. 7(a) to FIG. 7(c), and an outlined arrow B indicates a process of sliding the rod assembly 68 to the right in FIG. 7(a) to FIG. 7(c) and inserting the rod assembly 68 to a given fitting position.

As shown in FIG. 3, the release knob 40 of this example includes, as separate members, a knob body 70, a part of which projects from the distal end of the operating portion 22, and a spring receiving member 72 on which an end portion of the compression coil spring 46 abuts. In a shaft center of the spring receiving member 72, a through hole is provided, and the release rod 38 is inserted through the through hole so that the release rod 38 is able to be relatively moved in the axial direction, and, a large-diameter head portion 74 of the release rod 38 is retained in the knob body 70. The knob body 70 is provided with a housing hole 76 in which the large-diameter head portion 74 is housed so that the large-diameter head portion 74 is able to be relatively moved in the axial direction, and a compression coil spring 78 is arranged between the knob body 70 and the large-diameter head portion 74 inside the housing hole 76 so that the knob body 70 is urged in a direction in which the knob body 70 projects from the distal end of the operating portion 22, and that the large-diameter head portion 74 is constantly held in a state in which the large-diameter head portion 74 is seated on a securing wall 80 of the knob body 70. The knob body 70 is provided with a cut portion or the like that communicates with the housing hole 76 so that the large-diameter head portion 74 is able to be introduced into the housing hole 76. The release knob 40 is simplified and expressed in a simple columnar shape in the drawings other than FIG. 1(a) and FIG. 3.

With the release knob 40, in a case where a brake operation (a pull-up operation) of the operating lever 10 is performed, for example, during parking of a vehicle, and a parking brake is held in an operating state by meshing of the pole 30 and the ratchet 34, if the body of an occupant comes into contact with the knob body 70 at the time of ingress or egress, the knob body 70 is only pushed into the lever body 62 while flexural deformation in the compression coil spring 78 is caused, and the pole 30 does not pivot and is not disengaged from the ratchet 34. Thus, the parking brake is maintained in the operating state. In other words, when the parking brake is operated, the pole 30 is meshed with the ratchet 34 by tension of a brake cable with a relatively large force, and therefore, only the flexural deformation is caused in the compression coil spring 78 arranged inside the knob body 70, and it is not possible to push the release rod 38 to make the pole 30 pivot. On the other hand, in a case where the parking brake is released, when the operating lever 10 is pulled upward slightly against the tension of the brake cable, a meshing force between the pole 30 and the ratchet 34 is reduced. By pushing in the knob body 70 in that state, the release rod 38 is pushed and moved together with the knob body 70 through the compression coil spring 78, and the pole 30 is disengaged from the ratchet 34. This allows the operating lever 10 to be operated to return to the initial position.

As described above, in the parking brake operating device 60 according to this example, the slit 64, which is provided in the cylindrical operating portion 22 in the axial direction, has the width dimension W1 that allows the release rod 38 to be introduced, and is provided with the wide portion 66 into which the pivot connecting portion 42 is able to be introduced. It is possible to introduce the release rod 38 and the pivot connecting portion 42 into the operating portion 22 through the slit 64, and the rod assembly 68, in which the pole 30 and the release knob 40 are fitted to the release rod 38 in advance, is able to be moved as indicated by the arrows A and B in FIG. 6, and fitted at a given position within the lever body 62. In other words, it is possible to effectively fit the release rod 38 to the lever body 62 in a state where the pole 30 and the release knob 40 are fitted to the release rod 38. Also, since the wide portion 66 is provided in the slit 64 of the operating portion 22, which is away from the proximal end portion 20 supported by the support member 14, reduction in stiffness of the lever body 62 is suppressed compared to a case where a wide portion is provided in the proximal end portion 20 on which a large operation force acts. Also, since it is only necessary to partially increase the width dimension W1 of the slit 64 provided in the cylindrical operating portion 22, design is appropriately maintained.

The wide portion 66 is provided in a part of the slit 64, which is closest to the proximal end portion 20 in the longitudinal direction, and the distance L1 from the wide portion 66 to the distal end of the operating portion 22 is shorter than the distance L2 from the pivot connecting portion 42 of the release rod 38 to the release knob 40. Therefore, it is possible to introduce the release rod 38 and the pivot connecting portion 42 into the operating portion 22 through the slit 64 in the state of the rod assembly 68 in which the pole 30 and the release knob 40 are fitted to the release rod 38. Then, by moving the rod assembly 68 toward the proximal end portion 20 of the lever body 62, the release knob 40 is inserted into the operating portion 22 from the distal end opening of the operating portion 22, and thus, the release knob 40, the release rod 38, and the pole 30 are fitted at given positions inside the lever body 62. In that case, since the wide portion 66 is provided in a part of the slit 64, which is closest to the proximal end portion 20, reduction in feel of operation when gripping and operating the operating portion 22 is suppressed. In other words, when gripping and operating the operating portion 22, a reduction in feel of operation due to existence of the wide portion 66 is minimized because it is often the case that a distal end side portion of the operating portion 22 is gripped.

Although the example of the present invention has been described in detail based on the drawings, the example is merely one embodiment, and the present invention is able to be implemented in forms in which various changes and improvements are added based on knowledge of those skilled in the art.

NOMENCLATURE OF ELEMENTS

14: support member 20: proximal end portion 22: operating portion 30: pole 34: ratchet 38: release rod 40: release knob 42: pivot connecting portion 46: compression coil spring (urging means) 60: parking brake operating device 62: lever body 64: slit 66: wide portion

The invention claimed is:

1. A parking brake operating device comprising:
   a lever body that includes a proximal end portion that includes a section that has a substantially inverted U-shape and an operating portion with a substantially cylindrical shape, the proximal end portion being arranged across a support member and pivotally supported;
   a pole that is pivotally arranged inside the proximal end portion of the lever body, and restricts pivoting movement of the lever body so as to maintain a parking brake in an operating state when the pole is meshed with a ratchet provided in the support member in accordance with an urging force of an urging member; and
   a release rod that is connected to the pole so as to be able to pivot relative to the pole, and causes the pole to pivot so that the pole is disengaged from the ratchet when a release knob, which projects from a distal end of the operating portion, is pushed in,
   the release rod includes a pivot connecting portion at which the release rod is connected to the pole,
   the operating portion being provided with a slit that is formed in a circumferential wall of the operating portion and that is continuous with an opening with the inverted U-shape in the proximal end portion, and extends in an axial direction of the substantially cylindrical shape;
   the slit having a width dimension defined between respective edges of the circumferential wall that are opposed to each other in a direction perpendicular to a pivot plane of the lever body, the width dimension allowing the release rod to be introduced, the slit including a wide portion that is provided in a distal end of the slit toward the proximal end portion in the axial direction, the width dimension in the wide portion being larger than in another portion of the slit, which is other than the wide portion, such that the pivot connecting portion is able to be introduced through the wide portion of the slit into the operating portion of the lever body;
   the wide portion having an open end provided with a pair of protrusions that extend from the respective edges of the circumferential wall of the operating portion to an outer circumferential side of the operating portion, the protrusions being parallel to each other in a section perpendicular to the axial direction;
   the proximal end portion being provided with a pair of flanges that are bent outwardly away from a pair of side walls of the proximal end portion with the substantially inverted U-shape;
   an opening being provided over an entire length of the lever body in the axial direction, the opening consisting of the slit, an opening between the pair of protrusions and an opening between the pair of flanges; and
   the release rod and the pole fitted at given positions in the lever body by introducing the release rod into the operating portion through the slit, and moving the release rod in this state toward the proximal end portion, wherein:
   the pivot connecting portion is bent to be offset from another portion of the release rod, which is other than the pivot connecting portion, in the direction perpendicular to the pivot plane of the lever body,
   the urging member is disposed on the release rod and extends in an axial direction of the release rod, so as to force the release rod in a direction that causes the pole to be meshed with the ratchet provided in the support member, and
   a distance from the wide portion of the slit to the distal end of the operating portion is smaller than a distance from the pivot connecting portion that is to be offset from the other portion of the release rod in the direction perpendicular to the pivot plane of the lever body, to one of axially opposite ends of the urging member, the one of the axially opposite ends being remote from the release knob.

2. The parking brake operating device according to claim 1, wherein
   a distance from the wide portion to the distal end of the operating portion is shorter than a distance from the pivot connecting portion of the release rod to the release knob.

3. The parking brake operating device according to claim 1, wherein
the lever body is configured to pivot relative to the support member about an axis of a support shaft through which the lever body is supported by the support member,
the lever body includes, in the proximal end portion, (a) the pair of side walls opposed to each other in a direction substantially parallel to the axis of the support shaft and (b) an upper wall which is integrally formed with the side walls and which interconnects between the side walls, whereby the proximal end portion has the substantially inverted U-shape in a cross section thereof that is perpendicular to a longitudinal direction of the lever body, and
the side walls and the upper wall cooperate to define a space in which the support member, the pole and the pivot connection portion of the release rod are disposed.

4. The parking brake operating device according to claim 1, wherein
wherein the width dimension in the wide portion of the slit is larger than a width dimension of the pivot connecting portion as measured in the direction perpendicular to the pivot plane of the lever body.

5. A method of manufacturing a parking brake operating device including:
a lever body that includes a proximal end portion that includes a section that has a substantially inverted U-shape and an operating portion with a substantially cylindrical shape, the proximal end portion being arranged across a support member and pivotally supported;
a pole that is pivotally arranged inside the proximal end portion of the lever body, and restricts pivoting movement of the lever body so as to maintain a parking brake in an operating state when the pole is meshed with a ratchet provided in the support member in accordance with an urging force of an urging member; and
a release rod that is connected to the pole so as to be able to pivot relative to the pole, and causes the pole to pivot so that the pole is disengaged from the ratchet when a release knob, which projects from a distal end of the operating portion, is pushed in,
the release rod includes a pivot connecting portion at which the release rod is connected to the pole,
the operating portion being provided with a slit that is formed in a circumferential wall of the operating portion and that is continuous with an opening with the inverted U-shape in the proximal end portion, and extends in an axial direction of the substatially cylindrical shape;
the slit having a width dimension defined between respective edges of the circumferential wall that are opposed to each other in a direction perpendicular to a pivot plane of the lever body, the width dimension allowing the release rod to be introduced, the slit including a wide portion that is provided in a distal end of the slit toward the proximal end portion in the axial direction, the width dimension in the wide portion being larger than in another portion of the slit, which is other than the wide portion, such that the pivot connecting portion is able to be introduced through the wide portion of the slit into the operating portion of the lever body;
the wide portion having an open end provided with a pair of protrusions that extend from the respective edges of the circumferential wall of the operating portion to an outer circumferential side of the operating portion, the protrusions being parallel to each other in a section perpendicular to the axial direction;
the proximal end portion being provided with a pair of flanges that are bent outwardly away from a pair of side walls of the proximal end portion with the substantially inverted U-shape;
an opening being provided over an entire length of the lever body in the axial direction, the opening consisting of the slit, an opening between the pair of protrusions and an opening between the pair of flanges; and
the release rod and the pole fitted at given positions in the lever body by introducing the release rod into the operating portion through the slit, and moving the release rod in this state toward the proximal end portion, wherein:
the pivot connecting portion is bent to be offset from another portion of the release rod, which is other than the pivot connecting portion, in the direction perpendicular to the pivot plane of the lever body,
the urging member is disposed on the release rod and extends in an axial direction of the release rod, so as to force the release rod in a direction that causes the pole to be meshed with the ratchet provided in the support member, and
a distance from the wide portion of the slit to the distal end of the operating portion is smaller than a distance from the pivot connecting portion that is to be offset from the other portion of the release rod in the direction perpendicular to the pivot plane of hte lever body, to one of axial opposite ends of the urging member, the one of the axially opposite ends being remote from the release knob,
the method comprising:
preparing a first assembly including at least the lever body and the support member that supports the lever body;
preparing a second assembly including at least the release rod and the pole that are attached to each other;
moving the second assembly relative to the first assembly, such that at least the pole and the pivot connecting portion of the release rod is introduced into a space inside the lever body, by passing the pole and the pivot connecting portion through the wide portion of the slit, and such that the pole is positioned in a first position distant from the ratchet provided in the support member in a longitudinal direction of the lever body; and
moving the second assembly relative to the first assembly in a direction which reduces a distance from the pole to the ratchet in a longitudinal direction, such that the pole is positioned in a second position in which the pole can mesh with the ratchet.

* * * * *